(12) United States Patent
Casale

(10) Patent No.: US 12,089,523 B2
(45) Date of Patent: Sep. 17, 2024

(54) ARRANGEMENT INTRODUCED FOR AUTOMATIC PROTECTION AGAINST OPERATIONAL FAILURES IN AN AGRICULTURAL IMPLEMENT FOR MIXTURE AND/OR DISTRIBUTION OF A SOLID PRODUCT, HAVING VARIABLE GRANULOMETRY OF THE MIXER TYPE IMPLEMENT AND/OR DISTRIBUTOR

(71) Applicant: Celso Luís Casale, São Carlos (BR)

(72) Inventor: Celso Luís Casale, São Carlos (BR)

( * ) Notice: Subject to any disclaimer, the term of this patent is extended or adjusted under 35 U.S.C. 154(b) by 281 days.

(21) Appl. No.: 17/542,783

(22) Filed: Dec. 6, 2021

(65) Prior Publication Data
US 2022/0174862 A1 Jun. 9, 2022

(30) Foreign Application Priority Data
Dec. 7, 2020 (BR) .................. 10 2020 024920 7

(51) Int. Cl.
*A01C 19/02* (2006.01)
*A01C 15/00* (2006.01)
(Continued)

(52) U.S. Cl.
CPC ............ *A01C 19/02* (2013.01); *A01C 15/007* (2013.01); *A01C 15/18* (2013.01); *A01C 21/005* (2013.01)

(58) Field of Classification Search
CPC ....... A01C 19/02; A01C 15/007; A01C 15/18; A01C 21/005
(Continued)

(56) References Cited

U.S. PATENT DOCUMENTS 2,676,721 A * 4/1954 Hansen ............... A01D 90/10
414/502
3,393,899 A * 7/1968 Wells .................. B01F 33/502
366/300
(Continued)

FOREIGN PATENT DOCUMENTS

WO WO-9608963 A1 * 3/1996 .......... A01F 29/005
WO WO-2023046846 A1 * 3/2023 ............ B60K 17/28

*Primary Examiner* — Paul R Durand
*Assistant Examiner* — Michael J. Melaragno
(74) *Attorney, Agent, or Firm* — B. Aaron Schulman, Esq.; Stites & Harbison, PLLC

(57) ABSTRACT

The present invention belongs to the field of machines and agricultural implements, more concretely agricultural implements for the mixture and/or distribution of a solid product having variable granulometry, such as, for example, silage, crumbs, clusters, in powder, among others, such as feedstuff and mineral supplements. Moreover, the present invention brings as main advantage, relative to the implements known to the state of the art, the fact that it has a torque limiting means over the movable parts, such as helical pitch threads, augers and/or beater arms, so that there is no overload in the hydraulic system of the implement that is operatively associated to the tractor unit. Further, the invention in question counts on a protection means, with paralyzation and partial reversal and/or rotation reducer, in an independent and/or synchronized form, of the movable parts, in case the hydraulic circuit of the implement detects a pressure that is over the preestablished value, avoiding damages and unscheduled stops of the implement.

6 Claims, 4 Drawing Sheets

(51) Int. Cl.
*A01C 15/18* (2006.01)
*A01C 21/00* (2006.01)

(58) Field of Classification Search
USPC .......................................................... 222/626
See application file for complete search history.

(56) References Cited

U.S. PATENT DOCUMENTS

| | | | | | |
|---|---|---|---|---|---|
| 3,421,740 | A | * | 1/1969 | Behrens | B01F 27/726 366/186 |
| 3,604,688 | A | * | 9/1971 | Schuler | B01F 33/502 366/136 |
| 3,797,807 | A | * | 3/1974 | Behrens | A01K 5/002 366/186 |
| 3,871,587 | A | * | 3/1975 | Gail | A01C 15/00 239/662 |
| 3,995,836 | A | * | 12/1976 | Carter | B01F 33/502 366/300 |
| 4,049,145 | A | * | 9/1977 | Downing | A01D 90/10 414/502 |
| 4,467,590 | A | * | 8/1984 | Musser | A01D 69/00 56/11.2 |
| 4,480,927 | A | * | 11/1984 | Peat | B01F 33/502 366/318 |
| 4,538,916 | A | * | 9/1985 | Zimmerman | B28C 9/0463 366/186 |
| 5,462,354 | A | * | 10/1995 | Neier | B01F 33/502 366/314 |
| 5,782,559 | A | * | 7/1998 | Neier | B01F 33/821 366/279 |
| 6,182,448 | B1 | * | 2/2001 | Ohkura | F16H 61/4148 60/494 |
| 6,923,393 | B1 | * | 8/2005 | Neier | B01F 33/8305 366/603 |
| 9,046,160 | B2 | * | 6/2015 | Hoff | F16H 48/22 |
| 9,635,802 | B2 | * | 5/2017 | Rains | A01C 19/02 |
| 10,173,662 | B2 | * | 1/2019 | Muench | B60W 20/11 |
| 11,364,914 | B2 | * | 6/2022 | Jensen | B60W 30/188 |
| 2002/0195509 | A1 | * | 12/2002 | Lepage | A01D 87/127 241/186.3 |
| 2004/0014509 | A1 | * | 1/2004 | Brome | B60K 17/28 460/1 |
| 2004/0057338 | A1 | * | 3/2004 | Pecis | B01F 27/726 366/296 |
| 2007/0119161 | A1 | * | 5/2007 | Du | F16H 61/433 60/451 |
| 2008/0257573 | A1 | * | 10/2008 | Shoup | A01B 71/063 172/48 |
| 2009/0143952 | A1 | * | 6/2009 | Chisholm | F16H 61/475 701/99 |
| 2009/0171482 | A1 | * | 7/2009 | Mindeman | G05B 19/0426 700/83 |
| 2013/0327277 | A1 | * | 12/2013 | Aton | A01K 5/002 119/57.92 |
| 2015/0120148 | A1 | * | 4/2015 | Henson | B60W 30/1886 701/48 |
| 2015/0217242 | A1 | * | 8/2015 | Casale | B01F 27/071 366/343 |
| 2016/0052506 | A1 | * | 2/2016 | Muench | B60K 6/48 180/65.265 |
| 2017/0094893 | A1 | * | 4/2017 | Rains | A01C 7/044 |
| 2017/0105355 | A1 | * | 4/2017 | Rosseel | A01F 15/042 |
| 2019/0054476 | A1 | * | 2/2019 | Green | B02C 25/00 |
| 2020/0254888 | A1 | * | 8/2020 | Weiss | F15B 15/00 |
| 2021/0120745 | A1 | * | 4/2021 | Turner | B30B 9/306 |
| 2022/0024455 | A1 | * | 1/2022 | Jensen | F16H 61/472 |
| 2022/0064907 | A1 | * | 3/2022 | Fliearman | F15B 21/041 |
| 2022/0174862 | A1 | * | 6/2022 | Casale | A01C 15/007 |
| 2023/0020643 | A1 | * | 1/2023 | Duquesne | A01D 69/06 |
| 2023/0251606 | A1 | * | 8/2023 | Nair | G05B 17/02 700/28 |

* cited by examiner

ARRANGEMENT INTRODUCED FOR AUTOMATIC PROTECTION AGAINST OPERATIONAL FAILURES IN AN AGRICULTURAL IMPLEMENT FOR MIXTURE AND/OR DISTRIBUTION OF A SOLID PRODUCT, HAVING VARIABLE GRANULOMETRY OF THE MIXER TYPE IMPLEMENT AND/OR DISTRIBUTOR

FIELD OF THE INVENTION

The present invention belongs to the field of machines and agricultural implements, more concretely agricultural implements for the mixture and/or distribution of a solid product having variable granulometry, such as, for example, silage, crumbs, clusters, in powder, among others, such as feedstuff and mineral supplements. Moreover, the present invention brings as main advantage, relative to the implements known to the state of the art, the fact that it has a torque limiting means over the movable parts, such as helical pitch threads, augers and/or beater arms, so that there is no overload in the hydraulic system of the implement that is operatively associated to the tractor unit.

Further, the invention in question counts on a protection means, with paralyzation and partial reversal and/or reduction of rotation, in an independent and/or synchronized form, of the movable parts, in case the hydraulic circuit of the implement detects a pressure that is over the preestablished value, avoiding damages and unscheduled stops of the implement.

SUMMARY OF THE INVENTION

Agricultural implements and machines for the mixture and/or distribution of a solid product having variable granulometry are well known to the state of the art. Usually, these implements and machines are constructed by a chassis or other structural means, which has coupling means to a tractor unit, such as a wheel tractor, or truck or electric motor source, in the case of stationary machines.

In a construct that is known to the state of the art, the chassis or other structural means is constructed by steel beams or tubes, carrying on the upper part a reservoir or load box, wherein said reservoir forms a kind of encirclement over the chassis or structural means, with an upper opening for the loading and a selective gate opening for unloading. In the internal portion of the reservoir or load box, there are arranged means for turning and directing of a solid product having variable granulometry, such as silage, crumbs, clusters, powder, among others. The turning is made by a set of rotary arms, such as the inventions disclosed in the patent documents of the same holder as the present invention known by the numbers BR202012033309-6, entitled "Constructive arrangement applied in rotor for feed mixer" and BR102014002756-4 entitled "Arrangement for fixation of beater arms in rotor for feed mixer" or by helical pitch threads or augers, wherein said threads can be assembled in longitudinal direction or at the bottom depending on the model of the machine or agricultural implement.

These movable parts are bearings on the walls of the reservoir or load box, whereby a terminal portion, such as an hexagonal or splined shaft, for example, projects towards the exterior where it receives a motor element, such as a gear hydraulic motor or other means of transmission of mechanical, hydraulic or pneumatic force, known and suitable.

Considering that some solid products having variable granulometry demand great power on the part of the machine or agricultural implement, and, in humid conditions can require a power flow which is beyond that provided by the tractor unit, this ends by causing the locking of the set, the heating of the hydraulic fluid which rotates the hydraulic motors. In the mechanical transmission means cardan shafts are used with clutch systems, however, this makes it impracticable for hydraulic systems, whereby many times the hydraulic motor source sends an overload in torque causing damages to the entire hydraulic circuit of the machine or agricultural implement.

Thus, it is the objective of the present invention, the provision of an arrangement introduced for the automatic protection against operational failures in an agricultural implement for the mixture and/or distribution of a solid product having variable granulometry of the mixer type implement and/or distributor, wherein a pressure transducer means applied to the hydraulic circuit of the machine or implement can identify the maximum pressure or operation established by a computer control means, and provide the stop of the equipment, avoiding damages to the movable parts of the machine or implement.

It is a further objective of the present invention, the provision of an arrangement introduced for the automatic protection against operational failures in an agricultural implement for the mixture and/or distribution of a solid product having variable granulometry of the mixer type implement and/or distributor, wherein a computer means partially reverses the swivel direction and/or reduces rotation, in an independent and/or synchronized manner, of the movable parts of the machine or agricultural implement, so that there is an additional force ramp for disaggregating the products with variable granulometry that have caused the locking of the rotation of the movable parts of the machine or agricultural implement.

It is, finally, an objective of the present invention, the provision of an arrangement introduced for the automatic protection against operational failures in an agricultural implement for the mixture and/or distribution of a solid product having variable granulometry, of the mixer type implement and/or distributor, which presents easy construction, maintenance and competitive costs.

These and other advantages are reached by the provision of an arrangement introduced for the automatic protection against operational failures in an agricultural implement for the mixture and/or distribution of a solid product having variable granulometry of the mixer type implement and/or distributor, comprising a chassis or other structural means, constructed in beams or steel tubes, which carries on the upper part a reservoir or load box, wherein said reservoir is constructed in steel plates in hopper shape or other geometry that allows pouring the product having variable granulometry to the bottom, whereby in the upper part there is an opening for loading and in any one of the perimetral portions a selective gate opening, remotely controlled.

In the interior of the reservoir or load box there are bearings of at least one helical pitch thread or auger, which can alternatively interoperate with a set of revolving arms, whereby these movable parts are activated by means of the transmission of a mechanical, hydraulic or pneumatic force, arranged in a terminal portion of the movable parts, such as an hexagonal or splined shaft, for example, which are coupled to a motor source, such as a gear hydraulic motor among other known and suitable motor sources.

According to the present invention, whereby the movable parts are activated by means of a hydraulic or pneumatic circuit, there is a pressure reading means of the activating element, such as the hydraulic fluid, whereby this means is any known transducer so that once the pressure and/or speed rotation are exceeded, are preestablished by computer means, such as a micro-controller or data processor, there is activated a volumetric displacement control valve, where there occurs the interruption of the transmission of the motor source, once the work pressure is reestablished the unlocking stage is entered, in a reverse manner and/or having reduced the rotation, in an independent and/or synchronized manner, of the movable parts of the machine or agricultural implement, by a perimeter that is preestablished as ¼ of a turn, for example, whereby next there begins a new round of the circuit, whereby in the referred activation there is an additional force, inherent to the start ramp of a machine or equipment.

In situ the present construction has shown itself to be extremely suitable to the disaggregation of the products that cause the locking, whereby this control is made by means of an algorithm which delimits the pressures of the circuit so that it does not reach values that can damage the movable parts of the machine or agricultural implement operatively associated to the respective machine.

BRIEF DESCRIPTION OF THE FIGURES

The invention will be better understood based on the attached figures, shown as examples of a possible embodiment, wherein.

PREFERRED EMBODIMENT

Figure 1:
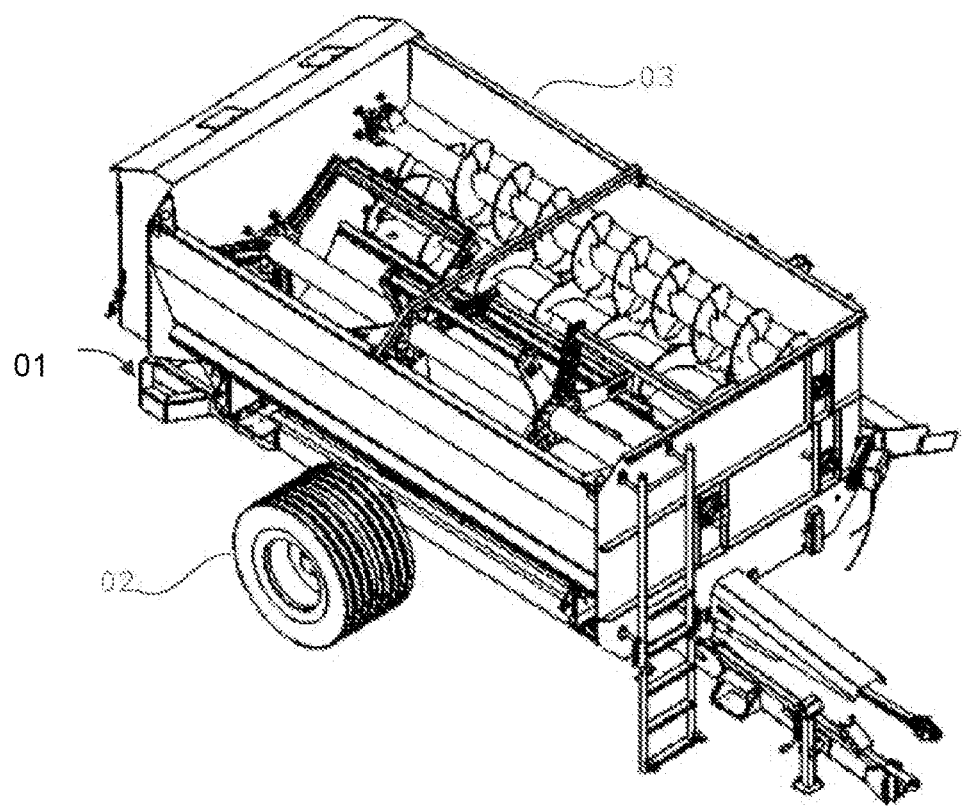
FIG. 01—Represents a perspective view of a turning and distribution set applied in the arrangement introduced in agricultural implement for the mixture and/or distribution of a solid product having variable granulometry of the mixer type implement and/or distributor.
Figure 2:
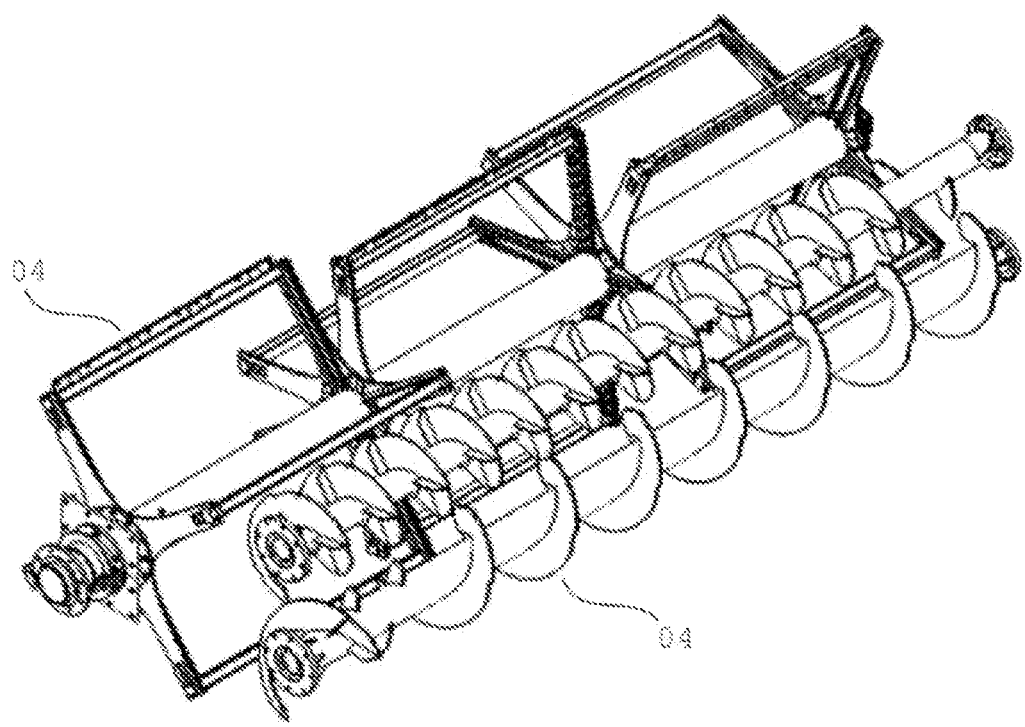
FIG. 02—Represents a perspective view of a turning and distribution set applied in the arrangement introduced for automatic protection against operational failures in an agricultural implement for the mixture and/or distribution of a solid product having variable granulometry or the mixer type implement and/or distributor, object of the present invention.
Figure 3:
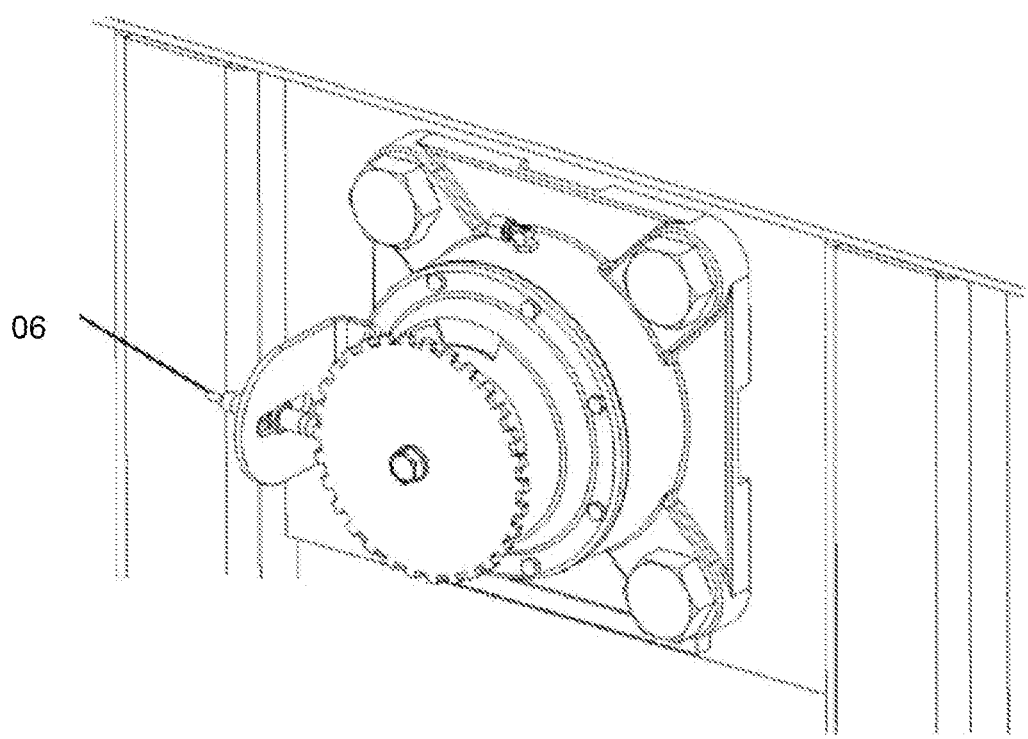
FIG. 03—Represents one of the sensing forms applied to the arrangement introduced for the automatic protection against operational failures in an agricultural implement for the mixture and/or distribution of a solid product having variable granulometry of the mixer type implement and/or distributor, object of the present invention.
Figure 4:
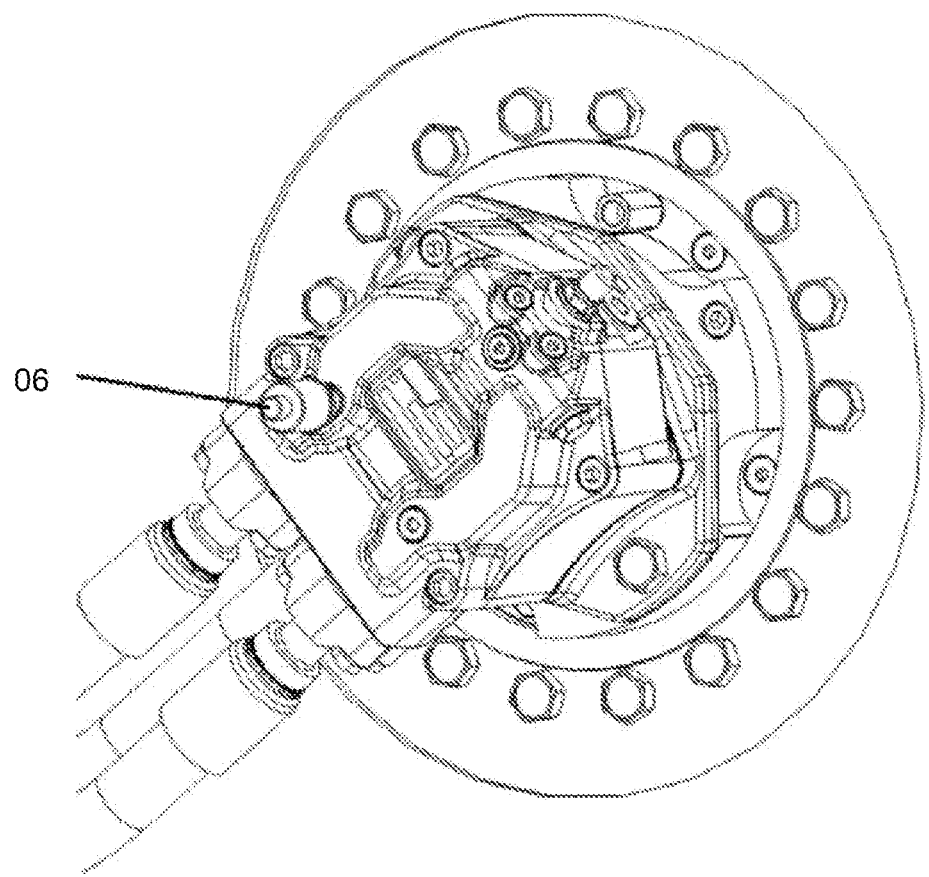
FIG. 04—Represents a form of installation, of a hydraulic circuit with pressure transducer, applied to the arrangement introduced for the automatic protection against operational failures in an agricultural implement for the mixture and/or distribution of a solid product having variable granulometry of the mixer type implement and/or distributor, object of the present invention.

Based on the drawings and figures listed above, the present invention comprises an arrangement introduced for automatic protection against operational failures in an agricultural implement for the mixture and/or distribution of a solid product having variable granulometry of the mixer type implement and/or distributor, conceived as from a machine or agricultural implement comprised of a chassis (01) or alternatively a structural frame, in the case of a stationary machine whereby this chassis or frame is constructed with beams or steel tubes, so that, as represented in the figures, said chassis is medium supported by at least one set of soil wheels (02), such as a simple or double wheelset in tandem, being preceded by coupling means to the tractor unit such as a wheel tractor, conveyors, over the chassis of a truck or a motor source associated to a stationary equipment.

Whereby the structure holds on the upper portion a reservoir or load box (03), constructed in steel plates, in hopper shape or other tapered geometry which allows the product with variable geometry to flow by gravity to the bottom. This reservoir or load box (03) has at least one helical pitch thread or an auger (04), with shaft bearings in the transversal walls thereof or at the bottom, whereby it can alternatively have beater arms (05), from these movable parts terminal portions are projected to the external part of the reservoir or load box, such as hexagonal or splined shafts, that receive a motor source, which can be a hydraulic motor, a pneumatic actuator or an electric motor, whereby this motor source has a sensing system for the loads imposed to the circuit, as represented in the figures, being a mechanical system, an optical or inductive sensor for reading the rotations of a gear box (06) can be employed, in the case of a hydraulic or pneumatic circuit there are used sensors or pressure transducers, such as hall effect valves, for example, which interoperate by means of a backplane, or a system of information transmission whether by analogic or digital signals, with a computer means, such as a circuit that is integrated with the combination of a multiplexer element and a demultiplexer, a micro-controlled electronic unit, among others, whereby the algorithm establishes a force or pressure limit for the circuit, so that, upon reaching this limit, in the case of hydraulic and pneumatic systems, the system activates the volumetric displacement control valve of the motor source, one the work pressure is reestablished the unlocking stage begins, in a reverse manner or by reduced rotation, in an independent and/or synchronized form, of the movable parts of the agricultural implement or machine, by a perimeter preestablished as ¼ turn, for example, whereby next there begins a new round for the disaggregation of the solid materials having variable granulometry occurs, which caused the locking of the system.

In a second constructive manner, more concretely in stationary machines there is carried out the sensing of the work tension of the motor unit or the gears, once a new overload is detected, the motor unit is turned off and/or the rotation is reduced, in an independent or synchronized manner, of the movable parts, by electric means known for reversal, such as for example, an electric circuit comprising an H bridge or other means of reversal of the rotation through the processing of an analogic or digital signal.

Having described only three constructive forms of embodiment of the arrangement introduced for automatic protection against operational failures in an agricultural implement for the mixture and/or distribution of a solid product having variable granulometry of the mixer type implement and/or distributor, it is clear that eventual changes can occur without departing from the scope of one or more claims which accompany the present specification.

The invention claimed is:

1. An arrangement for automatic protection against operational failures in an agricultural implement for mixture and/or distribution of a solid product having variable granulometry, said arrangement comprising:
 a chassis or a structural base constructed with beams or steel tubes, the chassis or the structural base operatively associated to a tractor unit;
 at least one helical pitch thread or auger, with bearing shafts in walls or a bottom of a reservoir or a load box, and a terminal element projecting from the at least one helical pitch thread or auger to the walls or the bottom of the reservoir or the load box, wherein the terminal element is coupled to a motor source; and a sensor that interoperates with a computer through a backplane or a wireless transmission network to activate a volumetric displacement control valve when a pressure limit is exceeded;

wherein the computer sends an analogic or digital signal for reversing a swivel direction and/or reducing rotation of the at least one helical pitch thread or auger, in an independent and/or synchronized manner, causing a new round in a circuit in a traction system of the at least one helical pitch thread or auger, thereby providing an additional force for disaggregating the solid product that has caused locking of the rotation of the at least one helical pitch thread or auger.

2. The arrangement according to claim 1, wherein the sensor interoperates with the computer so that when the normal work tension of the operation is exceeded, the direction of the at least one helical pitch thread or auger is reversed by an electric motor, beginning a new round.

3. The arrangement according to claim 1, wherein the tractor unit is selected from the group consisting of a wheel tractor, conveyors, and a truck.

4. The arrangement according to claim 1, wherein the terminal element is a hexagonal or splined shaft.

5. The arrangement according to claim 1, wherein the motor source is a hydraulic, electrical, or pneumatic motor.

6. The arrangement according to claim 1, wherein the sensor is selected from the group consisting of a pressure transducer, an optical sensor, and an inductive sensor.

* * * * *